Figure 1:
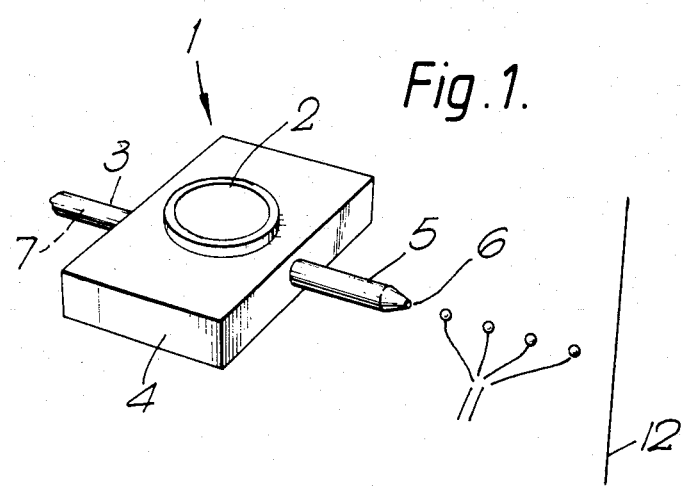

United States Patent [19]

Baxter et al.

[11] Patent Number: 4,634,555

[45] Date of Patent: Jan. 6, 1987

[54] WATER-SOLUBLE COPPER PHTHALOCYANINE DYES FREE FROM CELLULOSE REACTIVE GROUPS

[75] Inventors: Anthony G. Baxter, Manchester; Stephen B. Bostock, Bury; David Greenwood, Oldham, all of England

[73] Assignee: Imperial Chemical Industries PLC, London, England

[21] Appl. No.: 764,998

[22] Filed: Aug. 12, 1985

[30] Foreign Application Priority Data

Aug. 24, 1984 [GB] United Kingdom ................ 8421558

[51] Int. Cl.$^4$ ............................................. C09B 47/04
[52] U.S. Cl. ..................................... 540/126; 534/702
[58] Field of Search ...................... 260/242.2; 534/702

[56] References Cited

U.S. PATENT DOCUMENTS

| | | | |
|---|---|---|---|
| 3,445,449 | 5/1969 | Meininger et al. | 260/147 |
| 3,752,801 | 8/1973 | Hoelzle et al. | 534/702 X |
| 3,989,692 | 11/1976 | Jager et al. | 260/242.2 |
| 4,268,267 | 5/1981 | Duchardt et al. | 260/242.2 X |

FOREIGN PATENT DOCUMENTS 855693 11/1970 Canada .
473881 7/1969 Switzerland .

*Primary Examiner*—Richard L. Raymond
*Attorney, Agent, or Firm*—Cushman, Darby & Cushman

[57] ABSTRACT

A water-soluble dye, free from cellulose reactive groups, of the formula:

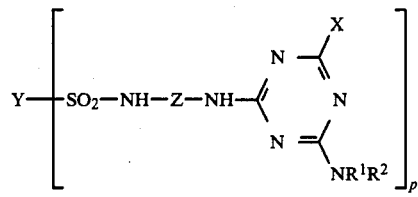

wherein
$R^1$ is —$(C_aH_{2a}O)_m(C_bH_{2b}O)_nH$,
$R^2$ is H or —$(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
Y is the residue of a copper phthalocyanine sulphonic acid of the formula:
$CuPc(SO_3M)_q$
p is from 1 to 3
q is from 1 to 3
p+q is from 3 to 4
M is H, ammonium, or a monovalent metal;
X is $NR^1R^2$, alkoxy, $NR^3R^4$ in which $R^3$ and $R^4$ are each independently selected from H, alkyl and aryl, or the residue of a mono- or dis-azo chromophore comprising benzene, naphthalene or mono- or bi-cyclic heteroaryl diazo and coupling components, linked to the triazine nucleus through a primary or secondary amine linking groups;
and Z is a divalent linking group, which is suitable for the preparation of a printing ink, especially for ink jet printing.

4 Claims, 4 Drawing Figures

U.S. Patent   Jan. 6, 1987   4,634,555

WATER-SOLUBLE COPPER PHTHALOCYANINE DYES FREE FROM CELLULOSE REACTIVE GROUPS

This specification describes an invention relating to a water-soluble dye and to an ink containing the dye which is suitable for use in ink jet printing.

According to the present invention there is provided a water-soluble dye, free from cellulose reactive groups, of the formula:

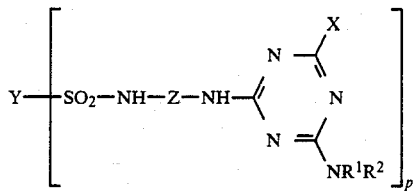

wherein $R^1$ is $-(C_aH_{2a}O)_m(C_bH_{2b}O)_nH$, $R^2$ is H or $-(C_aH_{2a}O)_m(C_bH_{2b}O)_nH$, or $R^1$ and $R^2$ together with the nitrogen atom form a morpholine ring a and b are different and from 1 to 8 m is from 1 to 10;

n is from 0 to 9;

Y is the residue of a copper phthalocyanine sulphonic acid of the formula:
$CuPc(SO_3M)_q$ p is from 1 to 3 q is from 1 to 3 p+q is from 3 to 4

M is H, ammonium, or a monovalent metal;

X is $NR^1R^2$, alkoxy, $NR^3R^4$ in which $R^3$ and $R^4$ are each independently selected from H, alkyl and aryl, or the residue of a mono- or dis-azo chromophore comprising benzene, naphthalene or mono- or bi-cyclic heteroaryl diazo and coupling components, linked to the triazine nucleus through a primary or secondary amine linking group;

and Z is a divalent linking group.

If the dye contains more than one $-(C_aH_{2a}O)_m(C_bH_{2b}O)_nH$ group these may be the same or different. It is preferred that, in the group $NR^1R^2$, a and b are from 2 to 6 and more preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)-propyl. It is especially preferred that $R^1$ is hydroxyethyl and $R^2$ is H or $R^1$ and $R^2$ are both hyroxyethyl or $NR^1R^2$ is morpholino.

Where X is $NR^3R^4$, $R^3$ is preferably H or $C_{1-4}$-allkyl and $R^4$ is preferably H, $C_{1-4}$-alkyl, mono- or bi-cyclic aryl or mono- or bi-cyclic heteroaryl. Where $R^4$ is mono- or bi-cyclic aryl, it is preferably a phenyl or naphthyl group carrying at least one sulphonic acid group, $SO_3M$, and optionally carrying other substituents. Examples of other substituents are sulphonate, carboxylate, ureido $C_{1-4}$-alkyl, $C_{1-4}$-alkoxy, mono- and di-alkylamino, unsubstituted and mono- and di-alkylamino-sulphonyl and carbonyl, phenylamino, $C_{1-4}$-alkyl-carbonylamino, hydroxy, nitro and halogen, especially chlorine.

Where X is the residue of a mono- or dis-azo chromophore carrying a diazotisable amino group and comprising benzene, naphthalene or hetero-mono- or bi-cyclic diazo and coupling components, it is preferably the residue of a monoazo dye comprising benzene and naphthalene diazo and coupling components preferably carrying at least one sulphonic acid group, $SO_3M$, and optionally carrying other substituents such as the substituents exemplified above for $R^4$.

The amine linking group in X may be of the general formula $-NR^3-$ in which $R^3$ is H, alkyl, preferably $C_{1-4}$-alkyl, or aryl, preferably phenyl, and it is preferred that $R^3$ is H or Me.

Examples of groups represented by X are hydroxyethylamino, di(hydroxyethyl)amino, $NH_2$, $OCH_3$, 5-hydroxy-6-(2-sulphophenylazo)-7-sulphonaphth-2-ylamino and 6-sulpho-7-(3,6,8-trisulphonaphth-2-ylazo)-8-hydroxynaphth-2-ylamino.

The divalent linking group Z is preferably $C_{2-6}$-alkylene, cycloalkylene, arylene, especially phenylene or biphenylene, aralkylene or aralkenylene, especially phenyl- or biphenyl-alkylene and alkenylene. Such groups may contain or be interrupted by heteroatoms, such oxygen, nitrogen and sulphur, which may themselves be substituted, e.g. $-SO_2-$ and $-NR^5-$. Alternatively the linking group Z may be a divalent chromophore e.g. derived from a mono or bisazo or stilbene chromophore. Examples of Z are ethylene, hexamethylene, phen-1,4-ylene, $-SO_2CH_2-$, 4-sulphonylphen-1-yl, $-(CH_2)_5O(CH_2)_5-$, 4-(ethyl-2-ene)phen-1-yl, $-C_2H_4SO_2C_2H_4-$, diphen-4,4'-ylene, diphen-4,4'-ylenemethane, diphen-4,4'-ylene ether and 4,4'-diiminostilbene.

Water-solubility is enhanced by the presence of acid groups such as carboxylic acid and sulphonic acid groups and also by groups represented by $NR^1R^2$, especially where $R^1$ and/or $R^2$ are hydroxyethyl or $R^1$ and $R^2$ are morpholino. It is preferred that the dye carries at least four and more preferably at least five water-solubilising groups. However, sulphonic acid groups are generally preferably to carboxylic acid groups and it is preferred that each chromophore attached to the triazine nucleus carries at least two, and more preferably at least three sulphonic acid groups, and that, where the dye contains two or more chromphores, the whole dye carries at least five and more preferably at least six sulphonic acid groups.

The species M, associated with the sulphonic acid groups, may be any monovalent cation which forms a stable water-soluble salt with the dye and is preferably ammonium, including substituted ammonium, e.g mono, di, tri and quaternary alkylammonium and substituted alkylammonium, such as tetramethylammonium and tri(hydroxyethyl)ammonium, or an alkali metal, such as sodium, potassium or lithium.

Examples of especially preferred water-soluble dyes are the following acid dyes, in the form of their potassium salts:

Dye 1. A dye of Formula I wherein $R^1$ is hydroxyethyl $R^2$ is H, X is hydroxyethylamino, p is 1, q is 3, M is Na and Z is $-C_2H_4-$.

Dye 2. A dye of Formula I wherein $R^1$, $R^2$, M and Z are as in Dye 1, p is 1.3, q is 2.7 and X is $OCH_3$.

Dye 3. A dye of Formula I wherein $R^1$, $R^2$, M, Z, p and q are as in Dye 1 and X is 6-sulpho-7-(3,6,8-trisulphonaphth-2-ylazo)-8-hydroxynaphth-2-ylimino (Na salt).

Dye 4. A dye of Formula I wherein $NR^1R^2$ is morpholino, X is 3-sulpho-4-(1-[4-sulphophenyl]-3-carboxypyrazolin-5-on-4-ylazo)-phenylimino (K salt), Z, p and q are as in Dye 1 and M is potassium.

Dye 5. A dye of Formula I wherein $R^1$ is 6-hydroxyhexyl and $R^2$, Z, M, X, p and q are as in Dye 2.

Dye 6. A dye of Formula I wherein $R^1$ is 3-(2-hydroxyethoxy)propyl, $R^2$, p, q and Z are as in Dye 1, M is tetramethylammonium and X is 5-hydroxy-6-(2-sulphophenylazo)-7-sulphonaphth-2-ylimino ($+N(CH_3)_4$ salt).

Dye 7. A dye of Formula 1 wherein $R^1$ and $R^2$ are 2-hydroxyethyl, p, q and Z are as in Dye 1, M is tri(hydroxyethyl)ammonium and X is 4-(4-[2,5-disulphophenylazo]-2,5-dimethylphenylazo)-3-ureido-phenylimino ($+NH[C_2H_4OH]_3$ salt).

Dye 8 A dye of Formula I which is identical to Dye 2 except that X is $NH_2$.

Dye 9 A dye of Formula I which is identical to Dye 2 except that X is 3-sulphophenylimino.

Dye 10 A dye of Formula I which is identical to Dye 2 except that X is $N(CH_3)_2$.

The dye of the present invention may be prepared by (i) chlorosulphonating a copper phthalocyanine (CuPC), reacting the product with the appropriate molar proportion of an alkylene or arylene diamine and hydrolysing any unreacted chlorosulphonate groups, (ii) reacting the resultant CuPC sulphonamide with cyanuric chloride under conditions such that one chlorine atom of the triazine is displaced by the CuPC sulphonamide, (iii) reacting the mono-substituted triazine with a compound XH, under conditions such that a second atom of chlorine is replaced by X and (iv) reacting the di-substituted triazine with $HNR^1R^2$ under conditions such that the third chlorine atom is replaced by $NR^1R^2$. Where X is $NR^1R^2$, the second and third chlorine atoms of the triazine nucleus may be replaced simultaneously.

The present invention in so far as it relates to dyes is further illustrated with reference to the following Examples in which all parts and percentages are by weight, unless otherwise indicated.

EXAMPLE 1

A solution of 280 g of copper 3-(2-[4,6-dichlorotriaziny-2-ylimino]ethyleneiminosulphonyl)phthalocyanine trisulphonic acid in 1200 g water and 200 g ethanolamine was prepared at 35° and heated to 65°-70° for 3 hours. After cooling to room temperature, salt (25% w/v) was added and the product filtered off. The filter cake was washed with 800 g brine (25% w/v) and pulled dry. The filter cake was then suspended in 1000 g water and salt added to give a 20% w/v brine solution. The product was filtered off and the filter cake washed with 800 g brine (20% w/v) and pulled dry. The product was suspended in 1000 g acetone, refiltered and pulled dry overnight.

The dried product was then dissolved in 1700 g distilled water and the pH adjusted to 7 with 1M hydrochloric acid. The pH was then adjusted to 9.5 by the addition of a solution of Analar sodium carbonate solution (20% w/v). After stirring for 30 minutes, the solution was filtered through a Whatman GF/C filter. The pH of the filtrate was then adjusted to 7-7.5 and the solution dialysed in Visking tubing until no more chloride ion could be detected in the effluent.

The dialysate was filtered through a Pall Ultipor N66 0.8 micron membrane filter and evaporated to dryness at reduced pressure to yield 109 g of Dye 1, i.e. the dye of Formula I wherein $R^1$ is hydroxyethyl, $R^2$ is H, q=3, p=1, M is Na, Z is ethylene and X is hydroxyethylamino.

EXAMPLE 2

A solution of 300 g of the compound of the formula:

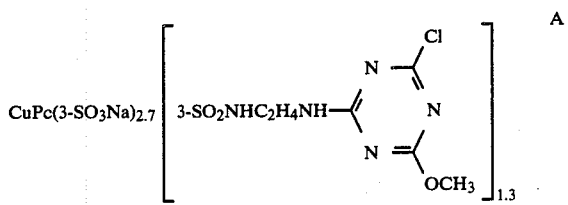

in 1500 g water and 120 g ethanolamine, prepared at 35° C., was heated to 65°-70° for 3 hours. After cooling to room temperature, salt (15% w/v) was added and the product filtered off. The filter cake was washed with 800 g brine (15% w/v) and pulled dry.

The filter cake was re-suspended in 1000 g water and salt (10% w/v) added. The product was filtered off and the filter cake washed with 800 g brine (10% w/v) and pulled dry. The filter cake was then slurried in 1000 g acetone and re-filtered. It was pulled dry overnight to yield 317 g of crude dye.

A solution prepared by dissolving 200 g of the crude product in 2000 g distilled water was adjusted to pH 7 with 1M hydrochloric acid. The pH was then adjusted to 9.5 by the addition of a solution of sodium carbonate (20% w/v). After stirring for 30 minutes, the solution was successively filtered through a Whatman GF/C filter, and Pall Ultipor N66 0.8 and 0.45 micron membrane filter. The pH of the filtrate was adjusted to 7.0-7.5 and the solution dialysed in Visking tubing until no chloride ion could be detected in the effluent.

The dialysate was evaporated to dryness under reduced pressure to yield a slightly tacky solid. This was suspended in 500 g acetone and refiltered to yield 131 g of Dye 2, i.e. the dye of Formula I in which $R^1$ is hydroxyethyl, $R^2$ is H, q=2.7, p=1.3, M is Na, Z is ethylene and X is $-OCH_3$.

EXAMPLE 3

To a solution of 16.7 g of the copper phthalocyanine derivative used as starting material in Example 1 in water (150 g) at pH 6.5 was added a solution of the monoazo dye 6-sulpho-7-(3,6,8-trisulphonaphth-2-ylazo)-8-hydroxynaphth-2-ylamine (8.6 g) in water (50 g) at pH 6.5. The mixture was warmed to 35°-40° C. and the pH held at 6.5 by the addition of 2M sodium hydroxide solution. After 5 hours, ethanolamine (3 g) was added and the mixture heated to 55°-60° C. for 7 hours.

Salt (15% w/v) was added and the pH adjusted to 1. The product was filtered off, washed with 1M hydrochloric acid (25 g) and re-slurried in 1M hydrochloric acid (100 g). After 1 hour the product was refiltered and washed with 1M hydrochloric acid until the liquors were pale red.

The resulting paste was added to water (250 g) and the pH adjusted to 7.5 to 8. The solution was subjected to dialysis and the resulting solution, free from inorganic compounds, evaporated to dryness at 50°-60° C. in vacuum to yield the dye hereinbefore identified as Dye 3, i.e. the dye of formula 1 wherein $R^1$ is hydroxyethyl; $R^2$ is hydrogen; X is 6-sulpho-7-(3,6,8-trisulphonaphth-2-ylazo)-8-hydroxynaphth-2-ylamino; p is 1; q is 3; M is sodium and Z is —$C_2H_4$—.

Ink

The aforementioned water-soluble dyes of the present invention are adapted for use in inks, particularly writing and printing inks based upon water and/or water-miscible organic solvents, such as alkanols and glycols, and especially inks suitable for ink-jet printing wherein the ink is ejected from an orifice of a recording head in the form of liquid droplets.

For recording on paper or the like with writing tools (fountain pen, felt pen, etc.), it is conventional to use inks which are solutions of dyes in water or a water miscible organic solvent and inks of similar composition are also used in ink-jet printing.

In ink-jet printing, droplets of ink are generated in various ways and deposited on a substrate to effect a record. Suitable inks comprise, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezo-electric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

Figure 2:
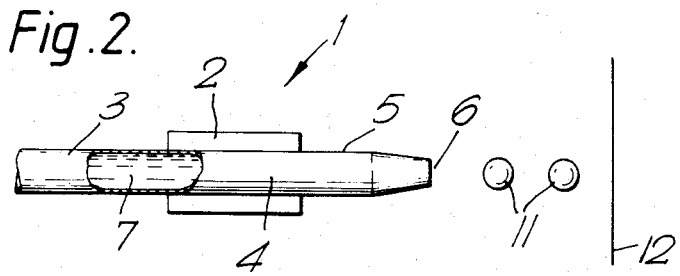

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

Figure 3:
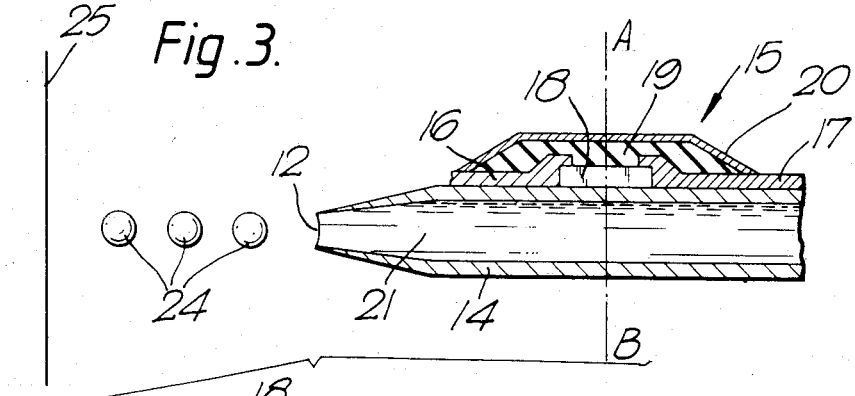
Figure 4:
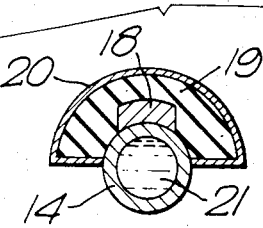

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-section view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

Inks for any of various types of ink-jet printing systems need to meet the following criteria:

(1) Physical properties of the ink, such as viscosity and surface tension, are each within a defined range.

(2) All solutes have good solubility in the ink medium to give solutions having good stability which do not plug the fine ejecting orifices (hereinafter referred to as "solution stability").

(3) The recording agent gives images of sufficient optical density.

(4) The ink does not change in physical properties or deposit solid matter during storage.

(5) Printing can be performed without a restriction on the nature of substrate on which a record is made.

(6) The ink exhibits a high rate of fixation.

(7) The ink gives images of good resolution and having good resistance to water, solvent (particularly alcohol), light, weather and abrasion.

However, images produced by conventional inks particularly by water-based inks, tend to form blots, dislocations or scratches, or to fade by water adhesion, mechanical friction, or exposure to light and an ink free from these drawbacks is an urgent requirement.

In addition to the above criteria, inks for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second aspect of the present invention there is provided an ink comprising a water-soluble dye of Formula I.

It is possible, by use of a dye of Formula I, to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light resistance.

The present ink preferably comprises the dye and a liquid medium, such as water, an organic solvent or a mixture thereof. The dye of Formula I has especially good solution stability in the above-mentioned liquid media, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the dye of Formula I, other dyes selected from various types of known dyes such as direct dyes, acid dyes, and the like but preferably contain only dye of Formula I or dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazol-idinone; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2-imidazolidione. Preferred specific solvent mixtures are a binary mixture of water and diethylene glycol and a tertiary mixture of water, diethylene glycol and N-methyl-pyrrolidone.

The present ink preferably contains in from 5–95%, preferably 10–80%, and especially 20–50%, by weight of the water soluble organic solvent based on the total weight of the ink.

The present ink, prepared from the components mentioned above, is generally characterised by excellent and balanced recording performance characteristics, i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention is so far as it relates to inks is further illustrated with reference to the following Examples in which all parts and percentages are by weight, unless otherwise indicated.

EXAMPLES 4

Inks were prepared, using the Dyes 1 to 3, as described above, according to the following recipe:
Dye: 5 parts
Diethylene glycol: 35 parts
Deionised water: 60 parts The above-mentioned inks were prepared by thorough mixing of the ingredients, filtering the solution under pressure through a Teflon filter (pore size: 1 micron) and degassing the filtered ink, in vacuo. For each of the inks the following five characteristics, $T_1$–$T_5$, were measured using a recording apparatus having an on-demand type of recording head (50μ-diameter ejecting orifice, piezooscillator driving voltage 60 V, frequency 4 KHz). Each ink gave good results in each test.

$T_1$-Prolonged Storage Stability

Each ink was sealed separately in a glass container and stored at −30° C. and at 60° C. for 6 months. In each case there was no appreciable separation of any insoluble matter or any change in physical properties and colour.

$T_2$-Ejection Stability

Each ink was subjected to continuous recording tests at room temperature, 5° C., and 40° C. for 24 hours. Each ink gave high quality images constantly throughout the test period at each temperature.

$T_3$-Ejection Responsiveness

Each ink was subjected to intermittent ejection at two-second intervals and ejection after standing for two months and each ink showed stable uniform recording without causing plugging of the orifice.

$T_4$-Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very litte blotting of the images.

| Paper | Supplier |
|---|---|
| IJ recording paper type S | Mitsubishi Paper Mills Ltd. |
| IJ recording paper type M | Mitsubishi Paper Mills Ltd. |
| IJ recording paper type L | Mitsubishi Paper Mills Ltd. |

$T_5$-Fixing Properties for Recording Member

Images recorded on the above-mentioned three types of recording paper were rubbed with a finger 15 seconds after recording, and without forming any smudges or blots, indicating the excellent fixation properties of the images.

EXAMPLE 5

An element for transforming electric energy into thermal energy was prepared on an alumina substrate as follows.

A $SiO_2$ (lower) layer 5 microns thick was formed over the alumina substrate by sputtering and a 1000 A $HfB_2$ layer, as a heat generating resistor layer, and a 3000 A aluminum layer, as an electrode, were successively laid thereover. A heat generating resistor pattern having size of 50×200 microns was formed by selective etching of the aluminum layer. A $SiO_2$ layer 3500 A thick, as a protective (upper) layer, was then laid thereover. A print head was formed by bonding a glass plate on which grooves 50 microns wide and 50 microns deep had been engraved onto the $SiO_2$ protective layer in register with the etched pattern on the heat generating resistor. The tip surface of orifice was then polished so that the distance between the tip of heat generating resistor and the tip surface of orifice was 250 microns.

The print head was operated by applying printing signals of $40 \text{ V} \times 10^{-5}$ sec rectangular voltage pulses at a cycle of $2 \times 10^{-4}$ sec. The print head operated normally and without blockage for 160 hours using an ink having the following composition:

| Dye 2 (decomp'n temp: 280° C.) | 5 parts |
|---|---|
| Diethylene glycol | 25 parts |
| N—methyl-2-pyrrolidone | 20 parts |
| Water | 50 parts |

In a comparative test the print head operated satisfactorily for only 10 hours, under the same conditions as above, using an ink having the same composition as the above ink except for the replacement of Dye 2 with C.I. Direct Blue 86, i.e. copper phthalocyanine-3,3'-disulphonic acid, sodium salt.

EXAMPLE 6

The print head was operated in the manner described in Example 5, using inks of the same recipe except for replacement of Dye 2 by the dyes listed in Table 1, by applying printing signals of $50 \text{ V} \times 10^{-5}$ sec rectangular voltage pulses at a cycle of $2 \times 10^{-4}$ sec. The resulting satisfactory operating periods are shown in Table 1.

TABLE 1

| Composition of ink | | Satisfactory |
|---|---|---|
| Dye No. | Content (wt %) | Operating Period (hours) |
| 1 | 5 | 150 |
| 1 | 6 | 120 |
| 2 | 5 | 170 |
| 2 | 7 | 120 |
| 3 | 5 | 150 |
| 3 | 6 | 140 |

EXAMPLES 7–12

Inks having the compositions defined in Table 2 were prepared and tested for properties $T_1$–$T_5$, in the same manner as in Example 4.

The results indicated that all these inks have good characteristics, and particularly excellent recording performance, fixation properties and sharpness of image.

TABLE 2

| Example No. | Dye No. (parts) | Liquid medium and other components (parts) |
|---|---|---|
| 7 | 1 (3) | Water (62) |
| | | Ethylene glycol (39) |
| | | 1,2,6-hexanetriol (5) |
| 8 | 2 (4) | Water (61) |
| | | Glycerol (25) |
| | | Triethanolamine (10) |
| 9 | 3 (3) | Water (67) |
| | | Diethylene glycol (30) |
| | | Methyl p-hydroxybenzoate (0.1) |
| 10 | 1 (2) | Water (68) |
| | | Triethylene glycol monomethyl ether (30) |
| | | Polyoxyethylene nonylphenol ether (0.1) |
| 11 | 2 (3) | Water (72) |
| | | Propylene glycol (20) |
| | | Dimethylformamide (5) |
| 12 | 3 (3) | Water (57) |
| | | Ethyl alcohol (10) |
| | | Glycerol (30) |
| | | Sodium dehydroacetate (0.1) |

EXAMPLE 13

The inks described in Examples 4 and 6–12 were charged separately into commercial fountain pens and records were made on plain paper. The results showed no blotting of image and high rates of absorption of ink in each case.

We claim:

1. A water-soluble dye, free from cellulose reactive groups, of the formula:

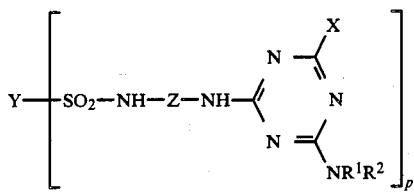

wherein $R^1$ is $-(C_aH_{2a}O)_m(C_bH_{2b}O)_nH$, $R^2$ is H or $-(C_aH_{2a}O)_m(C_bH_{2b}O)_nH$, or $R^1$ and $R^2$ together with the nitrogen atom form a morpholine ring a and b are different and from 1 to 8 m is from 1 to 10;

n is from 0 to 9;

Y is the residue of a copper phthalocyanine sulphonic acid of the formula:
$CuPc(SO_3M)_q$ P is from 1 to 3 q is from 1 to 3 p+q is from 3 to 4

M is H, ammonium, or a monovalent metal;

X is $NR^1R^2$, $OR^3$, or $NR^3R^4$ in which $R^3$ is H or $C_{1-4}$-alkyl and $R^4$ is selected from H, $C_{1-4}$-alkyl, phenyl and naphthyl in which the phenyl and naphthyl are unsubstituted or substituted by a group selected from $SO_3M$, sulphonate, carboxylate, ureido, $C_{1-4}$-alkyl, $C_{1-4}$-alkoxy, mono- and di-alkylamino, aminosulphonyl, mono- and di-alkylaminosulphonyl, aminocarbonyl, mono- and di-alkylaminocarbonyl, phenylamino, $C_{1-4}$-alkylcarbonylamino, hydroxy, nitro, and halogen;

Z is selected from $C_{2-6}$-alkylene, cycloalkylene, phenylene, biphenylene, phenylene-$C_{2-6}$-alkylene and biphenylene-$C_{2-6}$-alkylene, $-SO_2CH_2-$, 4-sulphonylphen-1-yl, $-(CH_2)_5O(CH_2)_5-$, $-C_2H_4SO_2C_2H_4-$, diphen-4,4'-ylenemethane, 4,4-diiminostilbene and diphen-4,4'-ylene ether.

2. A dye according to claim 1 wherein $NR^1R^2$ is selected from hydroxyethyamino, di-(hydroxyethyl)amino and morpholino.

3. A dye according to claim 2 wherein X is $NR^1R^2$.

4. The dye of claim 1 wherein q=2.7, p=1.3, M is sodium, Z is ethylene, $R^1$ is hydroxyethyl, $R^2$ is H and X is $OCH_3$.

* * * * *